US012773927B2

(12) United States Patent
Sorani et al.

(10) Patent No.: US 12,773,927 B2
(45) Date of Patent: Oct. 27, 2026

(54) POWER SUPPLY AND DISTRIBUTION SYSTEM FOR AN ELECTRIC VEHICLE AND A METHOD FOR CONTROLLING THE SYSTEM

(71) Applicants: Ningbo Geely Automobile Research & Development Co., Ltd., Ningbo (CN); Zhejiang Geely Holding Group Co., Ltd., Zhejiang (CN)

(72) Inventors: Heza Sorani, Västra Frölunda (SE); Peter Larsson, Gothenburg (SE)

(73) Assignees: NINGBO GEELY AUTOMOBILE RESEARCH & DEVELOPMENT CO., LTD., Ningbo (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 0 days.

(21) Appl. No.: 18/963,642

(22) Filed: Nov. 28, 2024

(65) Prior Publication Data

US 2025/0091480 A1 Mar. 20, 2025

Related U.S. Application Data

(63) Continuation of application No. PCT/CN2023/095074, filed on May 18, 2023.

(30) Foreign Application Priority Data

May 31, 2022 (EP) .................................... 22176434

(51) Int. Cl.
*B60L 58/18* (2019.01)
*B60L 50/51* (2019.01)
(Continued)

(52) U.S. Cl.
CPC ............... *B60L 58/18* (2019.02); *B60L 50/51* (2019.02); *B60L 50/60* (2019.02); *B60L 58/16* (2019.02);
(Continued)

(58) Field of Classification Search
CPC .......... B60L 58/18; B60L 50/51; B60L 50/60; B60L 58/16; B60L 2210/12;
(Continued)

(56) References Cited

U.S. PATENT DOCUMENTS 11,652,361 B1 * 5/2023 Matsumoto ............... B60L 1/00 307/23
2008/0220932 A1 * 9/2008 Bosch ................. F02N 11/0866 477/3
(Continued)

FOREIGN PATENT DOCUMENTS

DE 102017219421 A1 5/2019
DE 102017221758 A1 6/2019
(Continued)

*Primary Examiner* — Regis J Betsch
*Assistant Examiner* — Alex W Lam
(74) *Attorney, Agent, or Firm* — Tucker Ellis LLP

(57) ABSTRACT

A power supply and distribution system for an electric vehicle, includes a high voltage battery pack with first and battery modules, wherein the battery modules each have an individual power output connector. The battery pack is monitored and controlled by a Battery Electrical Control Module; wherein the battery modules are connected to respective DC-DC converters that convert high voltage DC to low voltage DC. The battery modules are individually connected to high voltage loads via a dual back-to-back switch unit that includes a back-to-back switches respectively connected to the battery modules and a Microcontroller in communication with the Battery Electrical Control Module. The Microcontroller controls the back-to-back switches, which are connected in parallel to high voltage equipment of the vehicle and arranged to be individually controlled by the Microcontroller.

11 Claims, 4 Drawing Sheets

(51) Int. Cl.
*B60L 50/60* (2019.01)
*B60L 58/16* (2019.01)

(52) U.S. Cl.
CPC ....... *B60L 2210/12* (2013.01); *B60L 2210/40* (2013.01); *B60L 2240/54* (2013.01)

(58) Field of Classification Search
CPC ............. B60L 2210/40; B60L 2240/54; B60L 2260/32; B60L 3/0084; B60L 3/0092; B60L 3/04; B60L 58/10; B60L 58/20; B60L 58/21; B60L 3/0046; Y02T 10/70
See application file for complete search history.

(56) References Cited

U.S. PATENT DOCUMENTS

| | | | | |
|---|---|---|---|---|
| 2015/0028019 | A1* | 1/2015 | Kamachi | B60L 53/62 219/484 |
| 2019/0291601 | A1 | 9/2019 | Vanerhav et al. | |
| 2021/0070191 | A1* | 3/2021 | Smith | H02M 3/155 |
| 2021/0265844 | A1* | 8/2021 | Jeon | H01M 10/441 |
| 2021/0376627 | A1* | 12/2021 | Sato | B60L 1/00 |

FOREIGN PATENT DOCUMENTS

| | | | |
|---|---|---|---|
| EP | 2117106 | A1 | 11/2009 |
| EP | 3667885 | A1 | 6/2020 |
| WO | 2020230202 | A1 | 11/2020 |

* cited by examiner

Figure 1 – Prior art

POWER SUPPLY AND DISTRIBUTION SYSTEM FOR AN ELECTRIC VEHICLE AND A METHOD FOR CONTROLLING THE SYSTEM

RELATED APPLICATION DATA

This application is a continuation of International Patent Application No. PCT/CN2023/095074, filed May 18, 2023, and claims the benefit of European Patent Application No. 22176434.3, filed May 31, 2022, the disclosures of which are incorporated herein by reference in their entireties.

TECHNICAL FIELD

The present disclosure relates to a power supply and distribution system for an electric vehicle and a method for controlling the power supply system for an electric vehicle.

BACKGROUND

In electrical vehicles, the electrical control units and components, including 12V battery charging, are powered from a DC-DC converter which converts power from the high voltage battery (800/400/48V) to low voltage (12V). Currently the automotive industry and most OEM's are moving towards increasing electrification of vehicles and in addition, self-driving systems of different levels are being introduced.

Self-driving systems require a high safety classification for the power supply system at the low voltage side (including the electrical distribution system), which has resulted in development of a dual power supply system. This covers any single point failure and provides sufficient power and energy to the critical electrical loads (e.g. self-driving, steering and braking system) at any time, as FIG. 1 shows.

Naturally the focus has always been on the redundancy of the low voltage side (12V) system because all electrical loads (including the safety critical) are rated for this voltage level. The primary energy source these systems is, however, in modern vehicles the high voltage battery. Single point failures which result in loss of the high voltage battery can occur in these systems leading to loss of power at the low voltage side. The 12V backup battery has very limited power supply which means that the vehicle must make a safe stop in a limited time during such failure modes.

There is thus a need in the industry for improved systems providing increased security and convenience in the event of single point failures in the vehicle power supply system.

SUMMARY

It is an object of the present disclosure to mitigate, alleviate or eliminate one or more of the above-identified deficiencies and disadvantages in the prior art and solve at least the above mentioned problem. According to a first aspect there is provided a power supply and distribution system for an electric vehicle, comprising a high voltage battery pack with a first battery module and a second battery module. The first battery module and the second battery module each has an individual power output connector and the high voltage battery pack is monitored and controlled by a first Battery Electrical Control Module. The first battery module is connected to a first DC-DC converter for converting high voltage DC to low voltage DC, and the second battery module is connected to a second DC-DC converter for converting high voltage DC to low voltage DC. The first battery module and the second battery module are individually connected to high voltage loads via a dual back-to-back switch unit, the dual back-to-back switch comprising a first back-to-back switch connected to the first battery module, a second back-to-back switch connected to the second battery module and a first Microcontroller unit in communication with the first Battery Electrical Control Module, the first Microcontroller unit controlling the first back-to-back switch and the second back-to-back switch. The first back-to-back switch and the second back-to-back switch are connected in parallel to the high voltage equipment of the electrical vehicle; and wherein the first back-to-back switch and the second back-to-back switch are arranged to be individually controlled by the first Microcontroller unit.

A redundancy is thereby achieved so that in case of a single point failure of the first battery module or the second battery module. The first Microcontroller module monitors the battery health using the first Battery Electrical Control Module and disconnects the failing battery module in case of failure without affecting all high voltage loads. It is understood that the DC-DC converter is a Direct Current to Direct Current converter, an as mentioned, in this case a conversion from high voltage in the range of 24-800 V, depending on the energy source of the vehicle, to low voltage direct current of 12 V used to drive most equipment.

The dual back-to-back switch can be made of any back-to-back switch consisting of a connection of two identical or similar components in series to facilitate a higher fail safety. The simplest back to back switch can be made by two simple electromechanical on-off switches in series, while a very fast and more advanced back-to-back switch can be made by two MOFET in series back-to-back. The first back-to-back switch and the second back-to-back switch can be constructed in a vast number of ways to accomplish the fail safety just described. A person skilled in the art understands that for the concept of the herein presented disclosure, any back-to-back switch suitable for the power rating of the electric vehicle power supply and distribution system can be used for the first back-to-back switch and the second back-to-back switch as long as they are possible to control by the first microcontroller unit.

A further advantage is that when the high voltage loads are disconnected from a failing battery module, any output from the failing battery module can be used for the less power consuming low voltage equipment of the vehicle. A still further advantage is that all low voltage critical systems for operating the vehicle can be kept running to make sure that the vehicle is operable as long as possible in case of battery failure.

According to some embodiments, the dual back-to-back switch is arranged to in case of failure of the first battery module disconnect the first battery module by opening the first back-to-back switch. The dual back-to-back switch is further arranged to in case of failure of the second battery module disconnect the second battery module by opening the second back-to-back switch. Thus, in case of a single point failure of the first battery module or the second battery module, the failing battery module can be disconnected without affecting all high voltage loads.

According to some embodiments, the power supply and distribution system comprises a second Battery Electrical Control Module in communication with a second Microcontroller unit; wherein the first battery module is monitored and controlled by the first Battery Electrical Control Module and the second battery module is monitored and controlled by the second Battery Electrical Control Module; and wherein the first back-to-back switch is arranged to be controlled by the first Microcontroller unit and the second back-to-back switch is arranged to be controlled by the second Microcontroller unit.

By using two Battery Electrical Control Modules and two Microcontroller units, the redundancy of the system is further increased.

According to some embodiments, the dual back-to-back switch is arranged to in case of failure of both the first battery module and the second battery module disconnect all high voltage equipment by opening both the first back-to-back switch and the second back-to-back switch. When both the first back-to-back switch and the second back-to-back switch are open all high voltage loads are disconnected. Both battery modules are, however, still connected to the low voltage loads via the first DC-DC converter and the second DC-DC converter. Any remaining power available in the failing battery modules may thereby be used for vehicle critical low voltage equipment required to operate the vehicle, e.g. to be able to steer and stop the vehicle.

According to some embodiments, the high voltage loads are comprised in the group consisting of electrical motors for propulsion of the vehicle, an electrical vehicle inlet, an on board charger.

According to some embodiments, the first back-to-back switch is connected, on the high voltage side, to a first group of high voltage loads and the second back-to-back switch is connected, on the high voltage side, to a second group of high voltage loads, wherein a third back-to-back switch is arranged between the first group of high voltage loads and the second group of high voltage loads. The third back-to-back switch is closed during charging so that only one inlet for electricity is needed when charging the first battery module and the second battery module. On the other side, when the vehicle is not charging the high voltage loads may be separated in two groups by opening the third back-to-back switch.

According to some embodiments, the first group of high voltage loads comprises a first electrical motor and the second group of high voltage loads comprises a second electrical motor. An advantage with this embodiment is that redundancy is achieved in case of failure of one of the first battery module and the second battery module.

According to a second aspect there is provided a method for controlling the power supply system for an electric vehicle according to the first aspect, comprising the steps of monitoring the health of the first battery module and the second battery module at the first Battery Electrical Control Module; communicating the health of the first battery module and the second battery module from the first Battery Electrical Control Module to the first Microcontroller unit; in response to determining at the first Microcontroller unit that the first battery module is failing, opening the first back-to-back switch; and in response to determining at the first Microcontroller unit that the second battery module is failing, opening the second back-to-back switch.

According to some embodiments, the method comprises the steps of monitoring the health of the first battery module at the first Battery Electrical Control Module and monitoring the health of the second battery module at the second Battery Electrical Control Module; communicating the health of the first battery module from the first Battery Electrical Control Module to the first Microcontroller unit and communicating the health of the second battery module from the second Battery Electrical Control Module to the second Microcontroller unit; in response to determining at the first Microcontroller unit that the first battery module is failing, opening the first back-to-back switch; and in response to determining at the second Microcontroller unit that the second battery module is failing, opening the second back-to-back switch.

A redundancy is thereby achieved so that in case of a single point failure of the first battery module and/or the second battery module.

According to some embodiments, the method comprises the steps of: opening the third back-to-back switch by default; and in response to detecting failure in the first battery module or the second battery module, closing the third back-to-back switch.

An advantage with this embodiment is that a further fail safe is introduced. In case of failure of only one battery module, all high voltage loads may be run on the remaining battery module also when the high voltage loads are divided into two separate groups by connecting the busbars for the first group of high voltage loads with the busbar of the second group of high voltage loads.

According to some embodiments, the method comprises the steps of: opening the third back-to-back switch by default; and in response to detecting charging of the power supply system, closing the third back-to-back switch. An advantage with this embodiment is that only one charging inlet is required to charge both the first battery module and the second battery module.

Effects and features of the second aspect are to a large extent analogous to those described above in connection with the first aspect. Embodiments mentioned in relation to the first aspect are largely compatible with the second aspect.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claims, the articles “a”, “an”, “the”, and “said” are intended to mean that there are one or more of the elements unless the context explicitly dictates otherwise. Thus, for example, reference to “a unit” or “the unit” may include several devices, and the like. Furthermore, the words “comprising”, “including”, “containing” and similar wordings does not exclude other elements or steps.

BRIEF DESCRIPTION OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

DETAILED DESCRIPTION OF EXAMPLE EMBODIMENTS

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Figure 1:
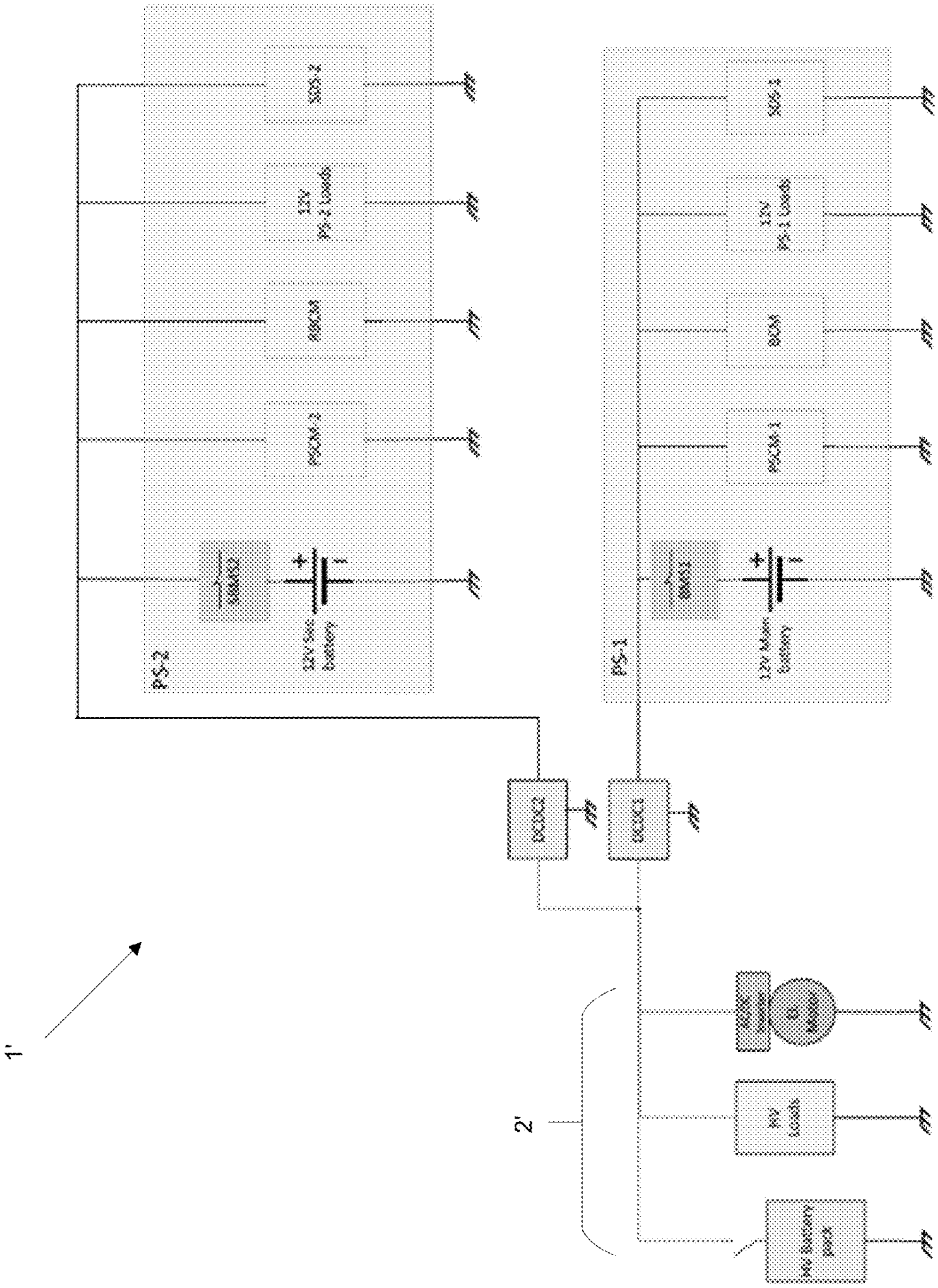
FIG. 1 shows a layout of a power supply system according the prior art.

FIG. 1 shows a layout of a power supply system 1' according to a typical prior art solution. The high voltage busbar 2' is connected to a high voltage battery, high voltage loads and an electrical motor for propulsion. The high voltage busbar 2' is connected to two separate DC-DC connectors DCDC1, DCDC2 for transforming high voltage to low voltage, the DC-DC connectors feeding each feeding a low voltage busbar PS-1, PS-2 connected to low voltage loads. Each low voltage busbar PS-1, PS-2 is connected to a 12V battery for backup power in case of failure of the high voltage battery. This is required as most safety critical equipment is low voltage equipment. In case of failure of the high voltage battery, the low voltage batteries are needed so that the vehicle can be safely taken out of traffic.

Figure 2:
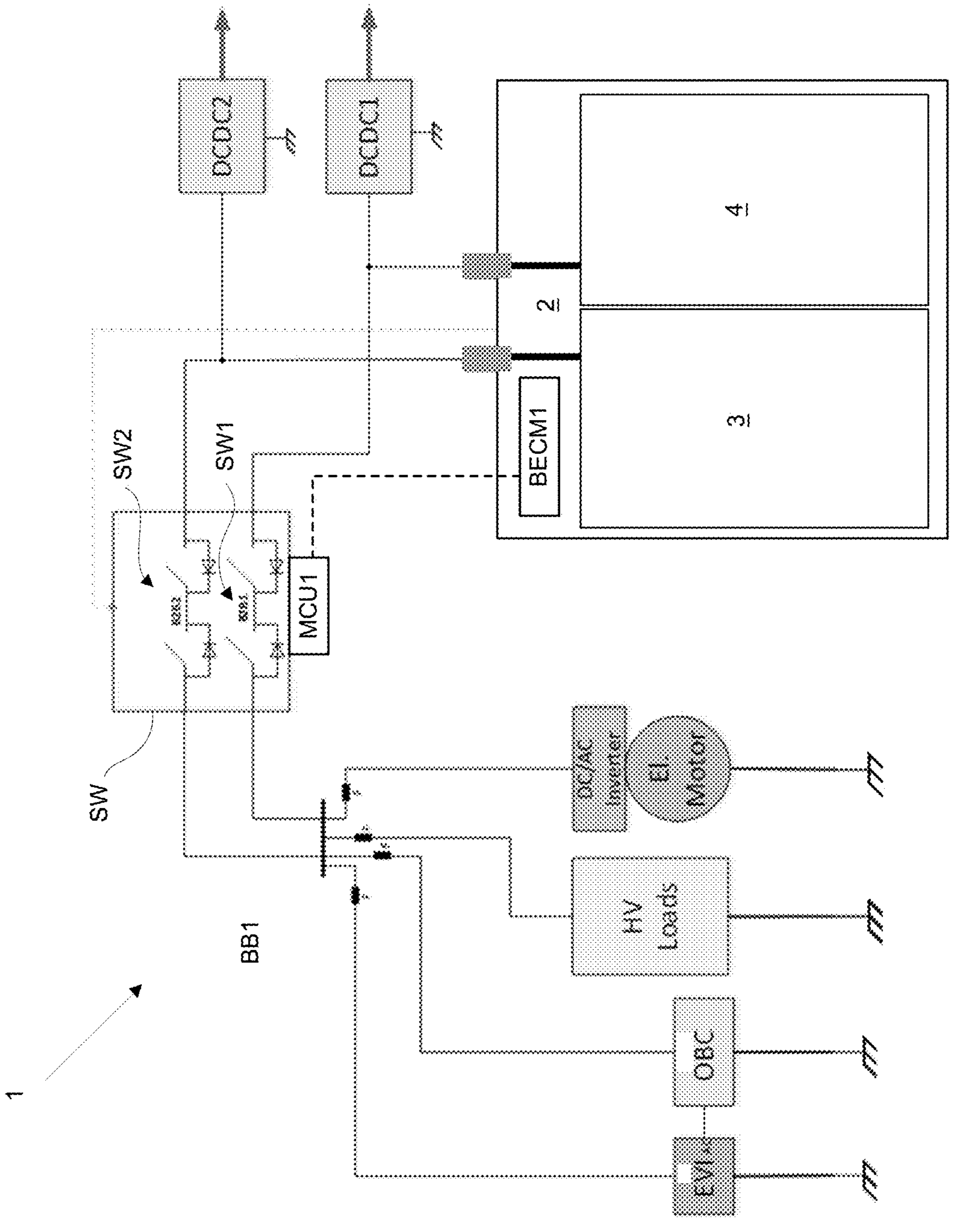
FIG. 2 shows a layout of a power supply system according to an embodiment of the present disclosure.
Figure 3:
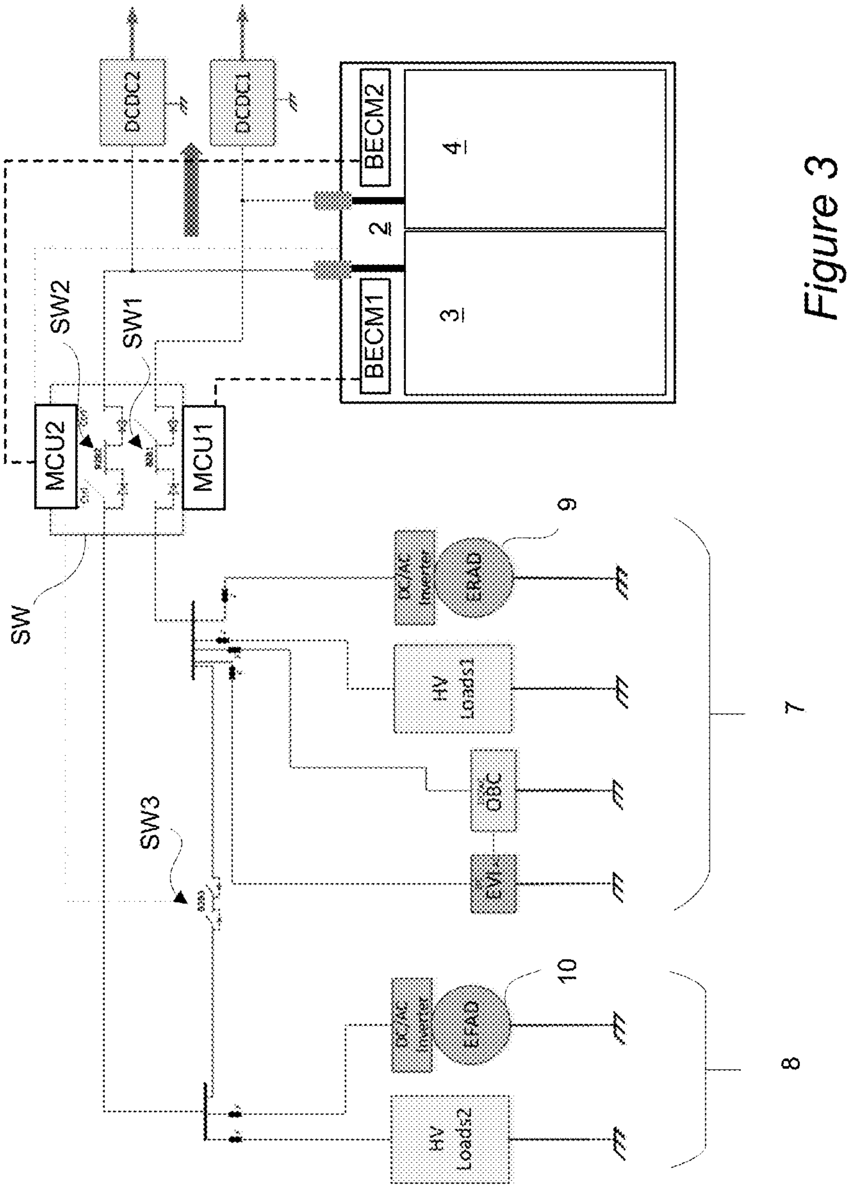
FIG. 3 shows a layout of a power supply system according to an embodiment of the present disclosure.

FIGS. 2 and 3 shows different embodiments of the first aspect of this disclosure. A power supply and distribution system 1 for an electric vehicle is disclosed, comprising a high voltage battery pack 2 with a first battery module 3 and a second battery module 4, wherein the first battery module 3 and the second battery module 4 each has an individual power output connector; and wherein the high voltage battery pack 2 is monitored and controlled by a first Battery Electrical Control Module BECM1; wherein the first battery module 3 is connected to a first DC-DC converter DCDC1 for converting high voltage DC to low voltage DC, and the second battery module 4 is connected to a second DC-DC converter DCDC2 for converting high voltage DC to low voltage DC; and wherein the first battery module 3 and the second battery module 4 are individually connected to high voltage loads via a dual back-to-back switch unit SW, the dual back-to-back switch SW comprising a first back-to-back switch SW1 connected to the first battery module 3, a second back-to-back switch SW2 connected to the second battery module 4 and a first Microcontroller unit MCU1 in communication with the first Battery Electrical Control Module BECM1, the first Microcontroller unit MCU1 controlling the first back-to-back switch SW1 and the second back-to-back switch SW2; wherein the first back-to-back switch SW1 and the second back-to-back switch SW2 are connected in parallel to the high voltage equipment of the electrical vehicle; and wherein the first back-to-back switch SW1 and the second back-to-back switch SW2 are arranged to be individually controlled by the first Microcontroller unit MCU1.

In FIG. 2 all high voltage loads are connected to a busbar BB1 which is connected via the dual back-to-back switch to the two the first battery module 3 and the second battery module 4 so that the busbar BB1 will be able to receive power from on of the first battery module 3 and the second battery module 4 also if one of them fails.

With reference to FIGS. 1 and 2 the first back-to-back switch SW1 and the second back-to-back switch SW2 are constructed by an on-off switch in parallel with a diode connected in series with an identical on-off switch in parallel with a diode, connected back-to-back (the diodes in opposite directions). The dual back-to-back switch can, however, be made of any back-to-back switch consisting of a connection of two identical or similar switching components in series to facilitate a switch with higher fail safety. The simplest back to back switch can be made by two simple electromechanical on-off switches in series, while a very fast and more advanced back-to-back switch can be made by two MOFET in series back-to-back. The first back-to-back switch SW1 and the second back-to-back switch SW2 can be constructed in a vast number of ways to accomplish the fail safety just described. However, for the concept of the herein presented disclosure, any back-to-back switch suitable for the power rating of the electric vehicle power supply and distribution system can be used for the first back-to-back switch SW1 and the second back-to-back switch SW2 as long as they are possible to control by the first microcontroller unit MCU1.

With reference to both FIGS. 2 and 3 the dual back-to-back switch SW is arranged to in case of failure of the first battery module 3 disconnect the first battery module 3 by opening the first back-to-back switch SW1; and in case of failure of the second battery module 4 disconnect the second battery module 4 by opening the second back-to-back switch SW2. Thus, in case of a single point failure of the first battery module or the second battery module, the failing battery module can be disconnected without affecting all high voltage loads.

The power supply and distribution system 1 further comprises a second Battery Electrical Control Module BECM2 in communication with a second Microcontroller unit MCU2; wherein the first battery module 3 is monitored and controlled by the first Battery Electrical Control Module BECM1 and the second battery module 4 is monitored and controlled by the second Battery Electrical Control Module BECM2; and wherein the first back-to-back switch SW1 is arranged to be controlled by the first Microcontroller unit MCU1 and the second back-to-back switch SW2 is arranged to be controlled by the second Microcontroller unit MCU2. By using two Battery Electrical Control Modules and two Microcontroller units, the redundancy of the system is further increased.

The dual back-to-back switch SW is arranged to in case of failure of both the first battery module 3 and the second battery module 4 disconnect all high voltage equipment by opening both the first back-to-back switch SW1 and the second back-to-back switch SW2. When both the first back-to-back switch and the second back-to-back switch are open all high voltage loads are disconnected. Both battery modules are, however, still connected to the low voltage loads via the first DC-DC converter and the second DC-DC converter. Any remaining power available in the failing battery modules may thereby be used for vehicle critical low voltage equipment required to operate the vehicle, e.g. to be able to steer and stop the vehicle.

The high voltage loads can be of many different types, e.g. electrical motors for propulsion of the vehicle, an electrical vehicle inlet, an on board charger etc.

With reference to FIG. 3 the first back-to-back switch SW1 is connected, on the high voltage side, to a first group of high voltage loads 7 and the second back-to-back switch SW2 is connected, on the high voltage side, to a second group of high voltage loads 8, wherein a third back-to-back switch SW3 is arranged between the first group of high voltage loads 7 and the second group of high voltage loads 8. The first group of high voltage loads 7 comprises a first electrical motor 9 and the second group of high voltage loads 8 comprises a second electrical motor 10. Further fail safe is thereby introduced. In case of failure of only one battery module, all high voltage loads may be run on the remaining battery module also when the high voltage loads are divided into two separate groups by connecting the busbars for the first group of high voltage loads with the busbar of the second group of high voltage loads.

Figure 4:
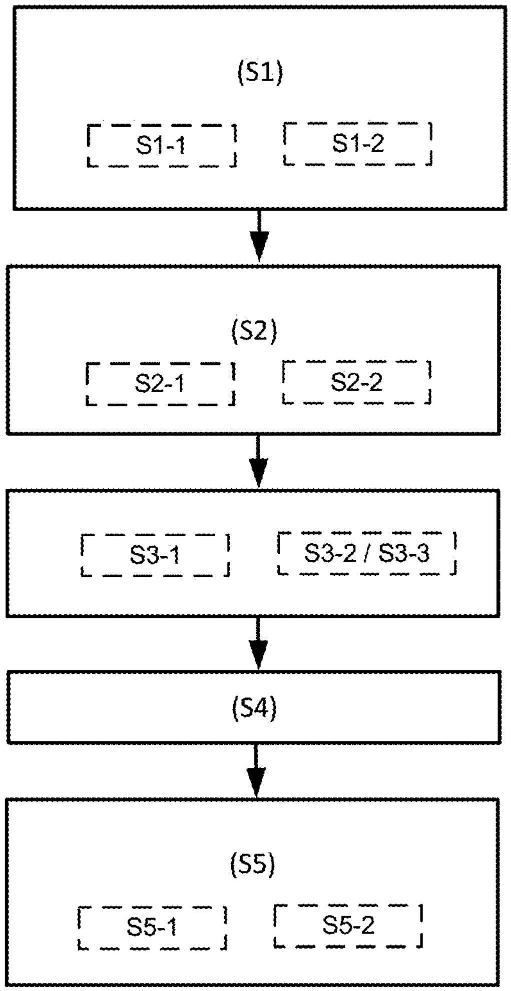
FIG. 4 is a block diagram showing a method according to the present disclosure.

The second aspect of this disclosure, illustrated by FIG. 4, shows a method for controlling the power supply system 1 for an electric vehicle according to the first aspect, comprising the steps of monitoring S1 the health of the first battery module 3 and the second battery module 4 at the first Battery Electrical Control Module BECM1. The method is then communicating S2 the health of the first battery module 3 and the second battery module 4 from the first Battery Electrical Control Module BECM1 to the first Microcontroller unit MCU1 and in response to determining at the first Microcontroller unit MCU1 that the first battery module 3 is failing, opening S3-1 the first back-to-back switch SW1 and in response to determining at the first Microcontroller unit MCU1 that the second battery module 4 is failing, opening S3-2 the second back-to-back switch SW2.

The problems of the prior art are thereby achieved as a fail safe system able to cope with a point of failure at any place in the power supply part of the system and use only a healthy battery module for the high voltage loads.

The method further comprises the steps of monitoring S1-1 the health of the first battery module 3 at the first Battery Electrical Control Module BECM1 and monitoring S1-2 the health of the second battery module 4 at the second Battery Electrical Control Module BECM2; communicating S2-1 the health of the first battery module 3 from the first Battery Electrical Control Module BECM1 to the first Microcontroller unit MCU1 and communicating S2-2 the health of the second battery module 4 from the second Battery Electrical Control Module BECM2 to the second Microcontroller unit MCU2; in response to determining at the first Microcontroller unit MCU1 that the first battery module 3 is failing, opening the first back-to-back switch SW1; and in response to determining at the second Microcontroller unit MCU2 that the second battery module 4 is failing, opening S3-3 the second back-to-back switch SW2.

According to some embodiments the method further comprises the steps of: opening S4 the third back-to-back switch SW3 by default; and in response to detecting failure in the first battery module 3 or the second battery module 4, closing S5-1 the third back-to-back switch SW3.

According to some embodiments the method further comprises the steps of: opening S4 the third back-to-back switch SW3 by default; and in response to detecting charging of the power supply system, closing S5-2 the third back-to-back switch SW3.

The person skilled in the art realizes that the present disclosure is not limited to the preferred embodiments described above. The person skilled in the art further realizes that modifications and variations are possible within the scope of the appended claims. For example, the battery could have three battery modules for even higher fail safety and corresponding increase in back-to-back switches, high voltage load groups, DC-DC converters etc. Additionally, variations to the disclosed embodiments can be understood and effected by the skilled person in practicing the claims, and from a study of the drawings, the disclosure, and the appended claims.

Below is a list with explanation of some abbreviations/references used in the Figures:

DCDC (Direct Current to Direct Current)
ADAS (Advanced Driving Assistance System)
ECU (Electrical Circuit Unit)
B2B (Back-To-Back)
BattM (Battery Module)
BECM (Battery Electrical Control Module)
EFAD (Electrical Front Axel Drive)
ERAD (Electrical Rear Axel Drive)
EVI (Electrical Vehicle Inlet)
OBC (On Board Charger)

What is claimed is:

1. A power supply and distribution system for an electric vehicle, comprising:

a high voltage battery pack with a first battery module and a second battery module, wherein the first battery module and the second battery module each has an individual power output connector;

a first Battery Electrical Control Module that monitors and controls the high voltage battery pack;

a first DC-DC converter connected to the first batter module for converting high voltage DC to low voltage DC, and a second DC-DC converter connected to the second battery module for converting high voltage DC to low voltage DC; and a dual back-to-back switch unit that connects the first battery module and the second battery module individually to high voltage loads via the dual back-to-back switch unit, the dual back-to-back switch unit comprising a first back-to-back switch connected to the first battery module, a second back-to-back switch connected to the second battery module and a first Microcontroller unit in communication with the first Battery Electrical Control Module, the first Microcontroller unit controlling the first back-to-back switch and the second back-to-back switch;

wherein the first back-to-back switch and the second back-to-back switch are connected in parallel to the high voltage loads of the electrical vehicle;

wherein the first back-to-back switch and the second back-to-back switch are arranged to be individually controlled by the first Microcontroller unit; and wherein, in a state in which the high voltage loads are disconnected from the first and second battery modules by the first and second back-to-back switches being open, the first and second battery modules are respectively connected to the first and second DC-DC converters so that low voltage DC is supplied to a least one low voltage load connected to at least one of the DC-DC converters.

2. The power supply system according to claim 1, wherein the dual back-to-back switch unit is arranged to in case of failure of the first battery module disconnect the first battery module by opening the first back-to-back switch; and in case of failure of the second battery module disconnect the second battery module by opening the second back-to-back switch.

3. The power supply system according to claim 1, further comprising a second Battery Electrical Control Module in communication with a second Microcontroller unit;

wherein the first battery module is monitored and controlled by the first Battery Electrical Control Module and the second battery module is monitored and controlled by the second Battery Electrical Control Module; and wherein the first back-to-back switch is arranged to be controlled by the first Microcontroller unit and the second back-to-back switch is arranged to be controlled by the second Microcontroller unit.

4. The power supply system according to claim 1, wherein the dual back-to-back switch unit is arranged to in case of failure of both the first battery module and the second battery module disconnect all high voltage loads by opening both the first back-to-back switch and the second back-to-back switch.

5. The power supply system according to claim 1, wherein the high voltage loads are comprised in the group consisting of electrical motors for propulsion of the vehicle, an electrical vehicle inlet, an on board charger.

6. The power supply system according to claim 1, wherein the first back-to-back switch is connected, on a load side of the first back-to-back switch, to a first group of high voltage loads and the second back-to-back switch is connected, on a load side of the second back-to-back switch, to a second group of high voltage loads, wherein a third back-to-back switch is arranged between the first group of high voltage loads and the second group of high voltage loads.

7. The power supply system according to claim 6, wherein the first group of high voltage loads comprises a first electrical motor and the second group of high voltage loads comprises a second electrical motor.

8. A method for controlling the power supply system for the electric vehicle according to claim 1, comprising the steps of monitoring the health of the first battery module and the second battery module at the first Battery Electrical Control Module;

communicating the health of the first battery module and the second battery module from the first Battery Electrical Control Module to the first Microcontroller unit;

in response to determining at the first Microcontroller unit that the first battery module is failing, opening the first back-to-back switch; and in response to determining at the first Microcontroller unit that the second battery module is failing, opening the second back-to-back switch.

9. A method for controlling the power supply system for the electric vehicle according to claim 3, comprising the steps of monitoring the health of the first battery module at the first Battery Electrical Control Module and monitoring the health of the second battery module at the second Battery Electrical Control Module;

communicating the health of the first battery module from the first Battery Electrical Control Module to the first Microcontroller unit and communicating the health of the second battery module from the second Battery Electrical Control Module to the second Microcontroller unit;

in response to determining at the first Microcontroller unit that the first battery module is failing, opening the first back-to-back switch; and in response to determining at the second Microcontroller unit that the second battery module is failing, opening the second back-to-back switch.

10. A method for controlling the power supply system for the electric vehicle according to claim 6, comprising the steps of:

opening the third back-to-back switch by default; and in response to detecting failure in the first battery module or the second battery module, closing the third back-to-back switch.

11. A method for controlling the power supply system for the electric vehicle according to claim 6, comprising the steps of:

opening the third back-to-back switch by default; and in response to detecting charging of the power supply system, closing the third back-to-back switch.

* * * * *